United States Patent
Finkelstein et al.

(10) Patent No.: US 6,378,715 B1
(45) Date of Patent: *Apr. 30, 2002

(54) SEPARATING CLOSURE LINER WITH PRESSURE SENSITIVE ADHESIVE

(75) Inventors: Harvey Finkelstein, Washington Township; Walter Burgess, Neshanic Station, both of NJ (US); Victor Flores, Goldens Bridge, NY (US); Anatoly Verdel, Fairlawn, NJ (US)

(73) Assignee: Tri-Seal Holdings, Inc., Somerville, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 520 days.

(21) Appl. No.: 08/715,210

(22) Filed: Sep. 17, 1996

(51) Int. Cl.$^7$ ............................................. B65D 53/00
(52) U.S. Cl. ..................... 215/341; 215/347; 215/349
(58) Field of Search .................... 215/341, 346–349, 215/232; 220/359.3

(56) References Cited

U.S. PATENT DOCUMENTS

| | | | |
|---|---|---|---|
| 3,632,004 A | | 1/1972 | Grimes et al. |
| 4,013,188 A | | 3/1977 | Ray |
| 4,171,084 A | | 10/1979 | Smith |
| 4,418,834 A | * | 12/1983 | Helms et al. ............ 220/359.3 |
| 4,579,240 A | | 4/1986 | Ou-Yang |
| 4,588,099 A | | 5/1986 | Diez |
| 4,588,465 A | * | 5/1986 | Paciorek .................. 215/347 X |
| 4,596,338 A | | 6/1986 | Yousif |
| 4,684,554 A | | 8/1987 | Ou-Yang |
| 4,754,890 A | | 7/1988 | Ullman et al. |
| 4,818,577 A | * | 4/1989 | Ou-Yang ................. 215/348 X |
| 4,917,949 A | | 4/1990 | Yousif |
| 4,961,986 A | * | 10/1990 | Galda et al. ............ 215/232 X |
| 5,092,477 A | * | 3/1992 | Johnson, Jr. et al. ........ 215/230 |
| 5,176,271 A | * | 1/1993 | Painchaud et al. ...... 215/230 X |
| 5,197,618 A | * | 3/1993 | Goth .................... 220/359.3 X |
| 5,381,913 A | * | 1/1995 | Peeters ........................ 215/232 |
| 5,433,992 A | * | 7/1995 | Galda et al. ............ 215/232 X |
| 5,598,940 A | * | 2/1997 | Finkelstein et al. ..... 215/347 X |
| 5,601,200 A | * | 2/1997 | Finkelstein et al. ..... 215/347 X |
| 5,615,789 A | * | 4/1997 | Finkelstein et al. ..... 215/347 X |

FOREIGN PATENT DOCUMENTS

EP           0530977 A2       3/1993

OTHER PUBLICATIONS

Apr. 25, 2001 Office Action issued by EPO in prosecution of European Patent Application No. 97202702.3.
Unipac Brochure, "There's A Unipac Induction Seal Just Right For Every Application", 3 pgs.
Safe–Gard™ Brand Brochure, "Innerseals", 2 pgs.
Safe–Gard™ Brand Brochure, "Innerseals Application Chart", 2 pgs.
Avadyne AV1200/CA100 Laminating Adhesive Brochure, Varitech Division, Pierce & Stevens, 3 pgs.
Craig–Stik 3391PI Brochure, Craig Adhesives, Oct. 1994.
Unipac Induction Seals ISPVC/PET–WD, ISPE–WD, ISP-P–WD Brochures, 3 pgs., May 1989.
Unipac Induction Seals Brochure ISPE/PP–WD, 1 pgs., Jun. 91.

* cited by examiner

Primary Examiner—Nathan J. Newhouse
Assistant Examiner—Robin A Hylton
(74) Attorney, Agent, or Firm—Hoffmann & Baron, LLP

(57) ABSTRACT

A separating closure liner comprises a laminate construction of a reusable liner portion and an inner seal portion, each separated by a light tack shearable adhesive. The light tack shearable adhesive enables the reusable liner portion to break away from the inner seal portion after it has been sealed to a container neck. The reusable liner portion remains in the closure of the container for sealing purposes. Use of the light tack shearable adhesive permits the use of polyolefin foamed materials as a reusable liner portion.

19 Claims, 3 Drawing Sheets

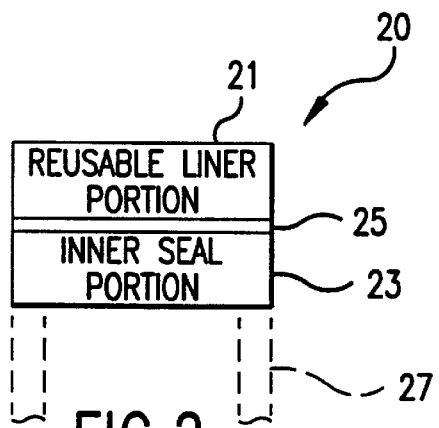
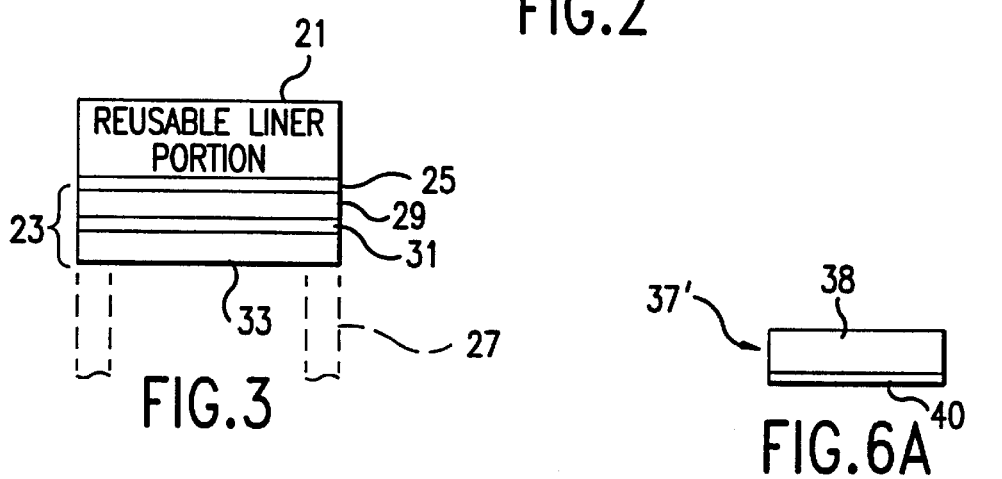
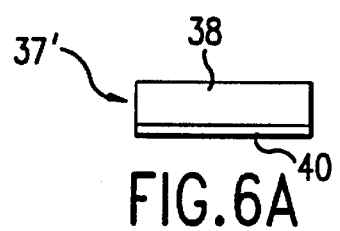
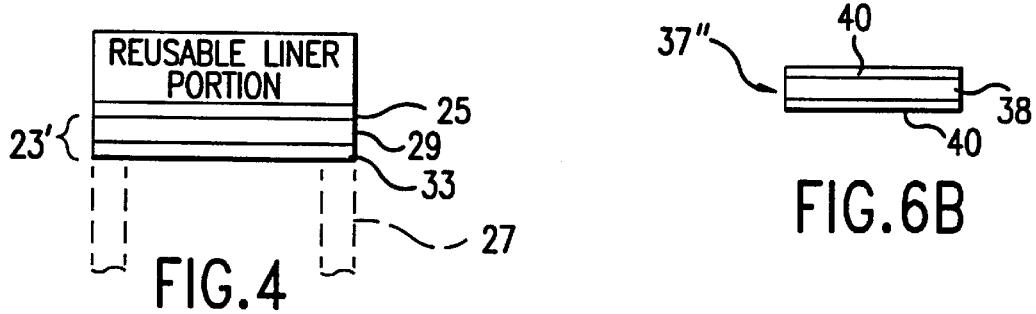
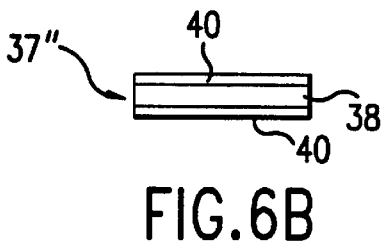
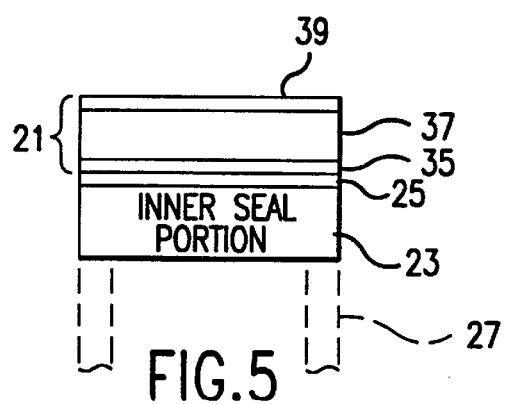

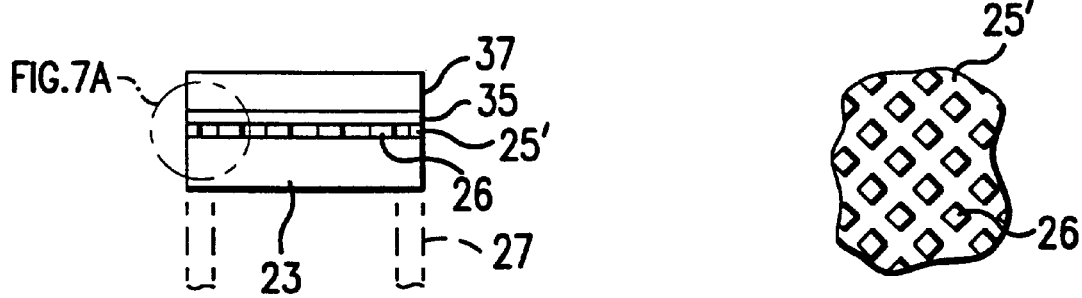 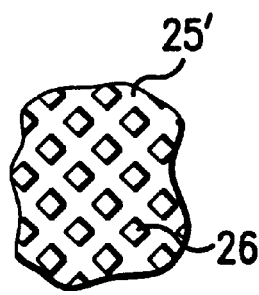
FIG.7  FIG.7A
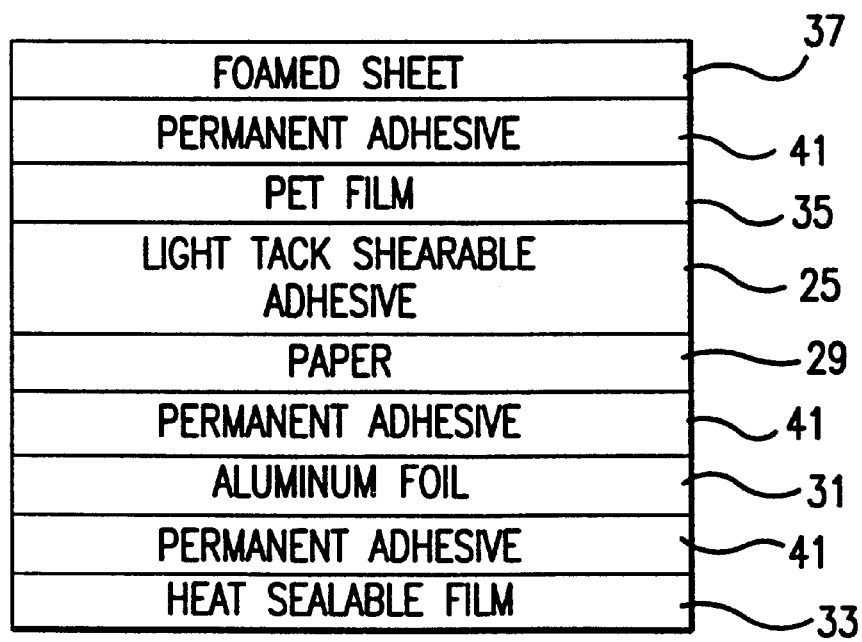
FIG.8

SEPARATING CLOSURE LINER WITH PRESSURE SENSITIVE ADHESIVE

TECHNICAL FIELD

The present invention is directed to a separating closure liner and, in particular, a closure liner having an inner seal and a reusable liner separated by a light tack shearable adhesive.

BACKGROUND ART

In the food, pharmaceutical, household chemical, automotive, agricultural chemical, beverage and personal care product industry, plastic and glass containers are being used for product packaging. In order to preserve the product freshness and the integrity of the package, an inner seal material is utilized. This inner seal material, usually a disc having a diameter matching the diameter of the container opening, is sealed to the container neck opening by fusion, adhesive means or the like. Once the product is purchased by a consumer, the inner seal is removed in order to access the product.

Many times, the containers must be resealed since the product is not completely used by the consumer. In these instances, the closure for the container must be capable of forming a seal at the container opening to prevent spillage, loss of product freshness, etc. Often times, the container closure has a lining material therein which forms a gasket or seal between the container opening and the closure for sealing purposes.

The prior art has proposed seals which provide both the inner sealing function described above and a closure lining material for sealing the container after its initial opening. Typically, these prior art seals have four parts. Referring now to FIGS. 1A–1C, a typical prior art seal 1 is shown in an exemplary use with a closure 3 for a container 6.

In FIG. 1A, the seal 1 comprises a pulp board backing 5, a wax coating 7, an aluminum foil 9 and a heat sealable film or coating 11.

In use, the seal 1 is inserted into the closure 3 and the closure 3 is then applied and tightened to the container neck 13, see FIG. 1B. The thus tightened closure is then subjected to an induction field which heats the aluminum foil 9 so as to melt the heat sealable coating or film 11. This melting forms a seal 15 at the face 17 of the container neck 13.

During the induction heating of the aluminum foil, the wax layer 7 diffuses into the pulp board backing 5.

Referring now to FIG. 1C, once the closure 3 is removed from the container neck 13, the pulp board backing and wax coating is separated from the aluminum foil 9 and heat sealable coating or film 11. The diffusion of the wax coating 7 into the pulp board 5 permits the release or separation of the pulp board and wax laminate from the aluminum foil-heat sealable coating or film laminate.

Once the closure 3 is removed so that the seal 1 is now in the form of a two-part laminate, a consumer can peel away the aluminum foil to access the product within the container 6. With the aluminum foil 9 and heat sealable coating or film 11 removed, the closure 3 can be reinstalled on the container neck 13 with the pulp board backing forming a reusable seal.

Various types of materials have been proposed for the components of these types of prior art seals. The heat sealable coating or film 11 can be a material which is compatible with the material of the container 6.

The prior art seals discussed above are not without their disadvantages. The pulp board liner can be easily affected by the product inside the container since it readily absorbs moisture. The pulp board liner will also not pass a wash cycle during which both the closure and the container are being cleaned by washing with water.

The wax component of these prior art seals also can cause problems since it is sensitive to humidity and the time and energy used for induction sealing. The wax layer can also be sensitive to storage and/or shipping due to possible degradation over time. The wax/pulp board laminate also fails to provide a high degree of compressibility which can adversely affect resealability of the closure.

In view of the disadvantages noted above, a need has developed to provide an improved separating closure liner which overcomes the problems with prior art seals or liners. In response to this need, the present invention provides a separating closure liner which has improved compressibility and resiliency, is not sensitive to induction sealing parameters or degradation of properties over time, can be used in high temperature filling operations, is not sensitive to humidity, provides superior liquid and gas barriers and can be subjected to a conventional wash cycle without liner degradation.

SUMMARY OF THE INVENTION

Accordingly, it is a first object of the present invention to provide an improved separating closure liner.

Another object of the present invention is to provide a separating closure liner which utilizes a light tack shearable adhesive to facilitate separation of a reusable liner portion and an inner seal portion.

A further object of the present invention is to provide a separating closure liner which utilizes a polyolefin foam as part of the reusable liner portion.

A still further object of the present invention is to provide a separating liner which is torque sensitive.

Other objects and advantages of the present invention will become apparent as a description thereof proceeds.

In satisfaction of the foregoing objects and advantages, the present invention provides an improvement in separating closure liners which comprise a reusable liner portion and an inner seal portion, wherein the reusable liner portion is sized to fit within a closure for a container and the inner seal portion acts as a seal on an opening of the container. According to the invention, a light tack shearable adhesive is positioned between one face of the reusable liner portion and an opposing face of the inner seal portion. This light tack shearable adhesive permits separation between the reusable liner portion and the inner seal portion after the inner seal portion is attached to the container opening.

In another aspect of the invention, a polyolefin foam layer is included as part of the reusable liner portion of the separating closure liner.

In one embodiment, the light tack shearable adhesive can be in the form of a layer of constant thickness between the reusable liner portion and the inner seal portion. In an alternative embodiment, the light tack shearable adhesive can be in the shape of a discontinuous pattern so that the light tack shearable adhesive does not cover the entire face of either the reusable liner portion nor the inner seal portion. By controlling the amount or pattern of the light tack shearable adhesive between these two portions, the torque necessary to separate the reusable liner portion from the inner seal portion can be varied.

In another aspect of the invention, a layer of material is provided between the light tack shearable adhesive and the inner seal portion. This layer is designed to have a necessary surface energy to provide a bond between the inner seal portion and the reusable liner portion. The bond should be strong enough to take this laminated structure through the punching process (when individual liners are punched from the rolls of the product) and weak enough to provide a separation of the reusable portion from the inner seal portion when the inner seal portion is sealed to the container opening by the induction field applied thereto. This separating mechanism is completely different from prior art wax laminated products wherein the wax provides a strong initial bond which disappears when the foil is heated in an induction field whereby the wax melts into a liquid and the liquid wax is absorbed by the adjacent pulp board.

Besides including a polyolefin foamed layer, the reusable liner portion can include the combination of a polyolefin foamed layer and a non-foamed polyolefin layer. The reusable liner portion can also include a heat resistant polymeric layer disposed between the polyolefin foamed layer and the light tack shearable adhesive.

In a preferred embodiment, the inventive separating closure liner has the following laminate construction: a heat sealing or peelable adhesive layer for attachment to a container. A metal containing layer such as aluminum foil is then positioned next to the heat sealable layer. A paper is then positioned adjacent the foil layer. Adjacent the paper layer is a light tack shearable adhesive layer, either in a continuous or discontinuous pattern. Next to the light tack shearable adhesive material is a heat resistant polymer layer. A foamed polyolefin layer is positioned adjacent the heat resistant polymer. Permanent adhesives may be used to facilitate attachment between the metal-containing and the heat sealable film as well as the paper and metal-containing layer. A permanent adhesive can also be used to attach the heat resistant polymer layer to the foamed polyolefin layer.

BRIEF DESCRIPTION OF DRAWINGS

Reference is now made to the drawings of the invention wherein:

FIG. 2 is a schematic representation of a first embodiment of the inventive separating closure liner;

FIG. 3 is a schematic representation of the inventive separating closure liner using one type of an inner seal portion;

FIG. 4 is a schematic representation of the inventive separating closure liner using an alternative inner seal portion;

FIG. 5 is a schematic representation of the inventive closure liner using one type of a reusable liner portion;

FIGS. 6A and 6B depict alternative embodiments of the reusable liner portion;

FIGS. 7 depicts an embodiment of the separating closure liner which is torque sensitive; and FIG. 8 is a schematic representation of a preferred embodiment of the inventive separating closure liner.

DESCRIPTION OF THE PREFERRED EMBODIMENTS

The present invention sets forth a unique separating closure liner which provides significant advantages over presently used prior art separating closure liners. In these types of prior art separating closure liners, a pulp board material is used as part of the closure's inner reusable seal. The present invention provides the capability of using a polyolefin foamed material as the reusable liner of the closure. This type of a reusable liner eliminates many of the disadvantages associated with prior art products. For example, liners using a pulp material are sensitive to humidity, will support mold growth and lack resiliency. These materials also cannot withstand wash cycles or hot filling of a container. Moreover, it is difficult to obtain a clean edge without fibers when cutting the pulp material into the particular form of a given closure liner, e.g., a disc.

The present invention's ability to utilize a polyolefin foamed reusable closure liner overcomes many of the disadvantages noted above. The polyolefin closure liner is not sensitive to humidity, can be cut into any shape with a clean edge, can be used when hot filling containers, is not sensitive to wash cycles. These types of liners are also insensitive to the induction time/energy conditions when sealing a container. These polyolefin foamed reusable liners also provide increased compressibility by reason of their higher resilience and are not sensitive to shipping and/or storage variables which may tend to degrade prior art liner material.

Figure 1A:
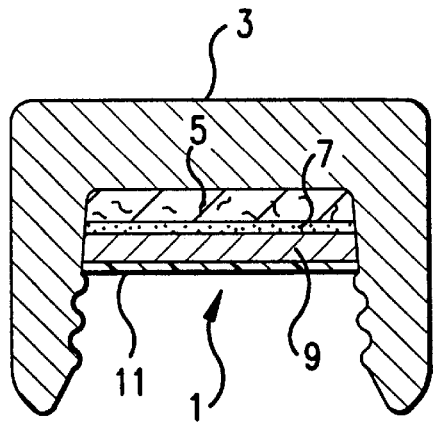
FIGS. 1A–1C are schematic representations of a prior art separating closure liner.
Figure 1B:
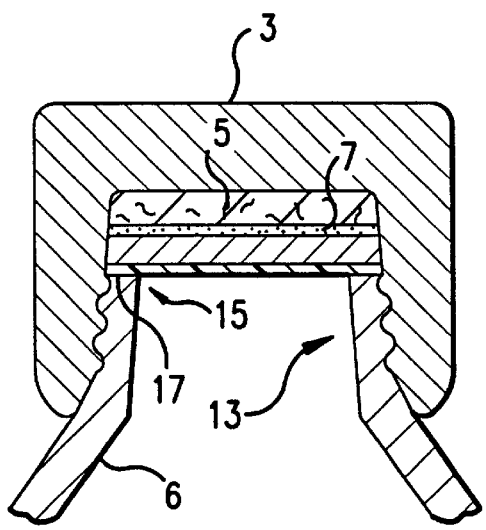
Figure 1C:
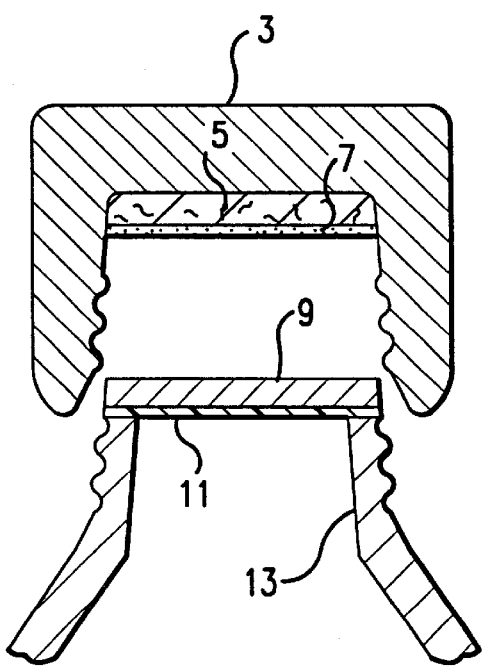

Referring now to FIG. 2, in its broadest embodiment, the inventive separating closure liner, designated by the reference numeral 20, is a laminate construction having three components. A reusable liner portion 21 is provided which is designed to fit within a closure, similar to the liner 5, 7 show in FIG. 1C.

An inner seal portion 23 is also provided which is designed to be attached to a container neck 27.

Positioned between the reusable liner portion 21 and the inner seal portion 23 is a light tack shearable adhesive 25.

In use, a disk of material comprising the separating closure liner 20 is cut to a desired size for attachment to the container neck 27 and insertion into a closure for the container neck 27. The light tack shearable adhesive 25 joins the reusable liner portion to the inner seal portion when the inner seal portion 23 is attached to the container neck 27. Attachment of the inner seal portion 23 can be done by the known techniques used in induction heating or by a peelable adhesive as will be described hereinbelow. Once the inner seal portion 23 is attached to the container neck 27 to seal the contents therein and the reusable liner portion is secured to a closure, the light tack shearable adhesive 25 permits separation of the reusable liner portion 21 from the inner seal portion 23 when the closure is removed from the container neck 27. The inner seal portion is then removed to access the contents within the container and the reusable liner portion 21 acts to seal the container neck 27 for subsequent openings and closings.

The light tack shearable adhesive 25 is a fugitive or temporary adhesive that is designed to hold paper together with a minimum of fiber-tear. The adhesive generally provides low tack and clean removability on various substrates. A preferred type of adhesive is CRAIG-STIK 3991PI which is manufactured by Craig Adhesives and Coatings Company of Newark, N.J. Although the exact chemistry of this preferred coating is not known, it is believed to be prepared by suspending particles of a latex-like product in water by means of different surface-active substances. The light tack shearable adhesive is activated by pressure applied to a web of the closure liner 20 when passing through a laminating nip of the web manufacturing line. In other words, the light tack shearable adhesive 25 bonds the reusable liner portion 21 to the inner seal portion 23 when the closure liner 20 is made in the known laminating process. Since these types of laminating processes are well known in the art, a further description thereof is not deemed necessary for understanding of the instant invention.

FIGS. 3 and 4 show alternative embodiments for the inner seal portion 23. In FIG. 3, the inner seal portion 23 comprises a paper layer 29, an aluminum foil 31 and a heat sealable film 33.

The paper layer 29 is designed to have proper surface characteristics to provide the necessary bond strength between the reusable portion of the liner and the inner seal portion.

The aluminum foil layer 31 is provided to achieve the induction sealing described above.

The heat sealable layer 33 is a polymer which in a molten state develops good adhesion to the container neck 27. These materials can be polyethylene, polypropylene, polystyrene, polyethylene terephthalate or the like.

In FIG. 4, an inner seal portion 23 is illustrated which does not require an induction field for sealing purposes. This type of liner is commonly referred to as an easily removed or peelable liner. Any known peelable adhesives can be used in this embodiment of the invention.

The aluminum foil layer 31 is a preferred embodiment of the invention. Any metal-containing material suitable for induction sealing can be utilized as this layer.

In FIG. 5, the inventive separating closure liner is depicted showing a preferred arrangement for the reusable liner portion 21. In this embodiment, the reusable liner portion 21 includes a heat resistant layer 35 and a foamed polyolefin layer 37.

The foamed polyolefin layer 37 can be any type of a foamed polyolefin. Alternatively, the layer 37 can comprise the combination of foamed polyolefin intermediate layer with one or two non-foamed outer layers 39. Referring now to 6A and 6B, alternative layers 37' and 37" are illustrated. In FIG. 6A, the layer 37' comprises a foamed layer 38 with a single outside layer 40. The foamed polyolefin layer 38 is preferably a homogenous mixture comprising 10 to 98% by weight of polypropylene with the balance polyethylene or a foamed admixture of 15 to 40% ethylene vinylacetate, 15 to 40% low density polyethylene and 15 to 40% of a copolymer comprising 10 to 90% polypropylene with the balance polyethylene. The outer layer preferably comprises a copolymer of 10 to 90% by weight polypropylene with the balance polyethylene or pure polypropylene.

As shown in FIG. 6B, the outer layer 40 can be positioned to sandwich the foamed layer 38. In the embodiment in FIG. 6A, the exposed surface of the foam layer 38 faces the closure.

These types of closure liners are disclosed in U.S. patent application Ser. Nos. 07/755,733 and 08/214,273, both of these herein incorporated by reference in their entirety.

Referring again to FIG. 5, disposed between the light tack shearable adhesive 25 and the foamed layer 37 is a heat resistant polymer 35. The function of this heat resistant polymer is to protect the foamed layer 37 from heat generated during induction sealing to secure the inner seal portion to the container neck 27. The heat resistant polymer can be any known type to achieve this function but is preferably a polyester layer.

Another aspect of the inventive separating closure liner is the ability to adjust the laminate construction to accommodate differing torque requirements. In certain applications, it may be desirable to require a high torque to separate the inner seal portion from the reusable liner portion. In other instances, it may be desirable to have a minimum torque requirement for this separation. To meet these needs, the light tack shearable adhesive 25 can be altered in terms of its thickness, pattern or the like.

Referring now to FIG. 7, a light tack shearable adhesive layer 25' is depicted which is in the form of a cross-hatched pattern. In this pattern, voids 26 exist between the heat resistant polymer 35 and the inner seal portion 23. As a result of the pattern in the layer 25', less light tack shearable adhesive is used and, therefore, less torque is required to achieve separation between the reusable liner and the inner seal portion. It should be understood that the pattern of the light tack shearable adhesive layer 25 can be altered to vary the amount of light tack shearable adhesive so as to vary the torque requirement to achieve separation. While the pattern depicted in FIG. 7 is interconnected, the light tack shearable adhesive can be in the form of pattern squares or circles. In fact, the pattern can take any shape as long as the desired amount of light tack shearable adhesive is provided for a desired torque.

FIG. 8 shows a more preferred embodiment of the separating closure liner. In this embodiment, a permanent adhesive is used to join certain of the layers of the closure liner. The permanent adhesive 41 is used to provide a sufficient bond between the various films, foils and paper layers of the closure liner. Generally, the permanent adhesive bond is sufficient if it has a peel strength of about 400 grams per one inch wide strip. The bond is achieved by applying a thin layer of a water-based 2-part polyurethane emulsion to a flexible web such as either the foil 31, the heat sealable film 33 or the like. Subsequent evaporation of liquid part of the emulsion is achieved by heating the web in a gas-heated air dryer. An exemplary system is made by Pierce & Stevens, Varitech Division of Buffalo, N.Y., the adhesive being AV 1206 and the curative agent being CA100. By blending these two different components, a cross-linking reaction is initiated in the water-suspended polyurethane particles. Once the components are mixed, an initial bond is developed, the complete bonding occurring within a few days of curing period. Other systems equally useful for the inventive separating closure liner are adhesive 5411 and catalyst 2844 made by UPACO Adhesives, a division of Worthen Ind. Inc., Nashua, N.H., similar to the Pierce & Stevens system described above. Of course, other known permanent adhesives can be used to achieve the function of bonding certain of the layers of the closure liner together.

In the reusable liner portion, a permanent adhesive such as the Pierce & Stevens system described above is used to attach the foamed sheet 37 to the heat resistant polyester film 35. Similarly, a permanent adhesive is used to secure the paper layer 29 to the foil 31 and the foil 31 to the heat sealable film 33. While the use of these permanent adhesives is preferred, any known means can be used to assure that the various layers disclosed in FIG. 8 are secured together. For example, during the manufacture of the separating closure liner, laminating the various materials to each other may form a sufficient mechanical type bond to avoid the need for one or more of the permanent adhesives 41.

The thicknesses of the various layers can be altered depending on the particular closure liner application as is known in the art.

As such, an invention has been disclosed in terms of preferred embodiments thereof which fulfill each and every one of the objects of the present invention as set forth hereinabove and provides a new and improved separating closure liner.

Of course, various changes, modifications and alterations from the teachings of the present invention may be contemplated by those skilled in the art without departing from the intended spirit and scope. Accordingly, it is intended that the present invention only be limited by the terms of the appended claims.

What is claimed is:

1. In a separating closure liner comprising:
   a) a reusable liner portion;
   b) an inner seal portion;
   wherein the reusable liner portion is sized to fit within a closure for a container and the inner seal portion acts as a seal on an opening of the container, the improvement comprising
      i) a pressure sensitive light tack shearable adhesive joining one face of the reusable liner portion to an opposing face of the inner seal portion, said adhesive more readily failing in shear than said reusable liner portion so as to enable separation of the reusable liner portion from the inner seal portion; and
      ii) a polyolefin layer as part of the reusable liner portion.

2. The separating closure liner of claim 1, wherein the reusable liner portion and inner seal portion are in the form of a disc.

3. The separating closure liner of claim 1, wherein the light tack shearable adhesive is a layer of uniform thickness between the reusable liner portion and the inner seal portion.

4. The separating closure liner of claim 1, wherein the light tack shearable adhesive is in a pattern.

5. The separating closure liner of claim 4, wherein the pattern is in a shape of intersecting lines.

6. The separating closure liner of claim 1, wherein the inner seal portion comprises:
   i) a heat sealable coating for sealing to the container;
   ii) a metal-containing layer; and
   iii) a separating layer to facilitate bonding of the reusable liner portion and inner seal portion during separating closure liner manufacture.

7. The separating closure liner of claim 6, wherein the separating layer is a paper-containing layer.

8. The separating closure liner of claim 6, wherein the metal-containing layer is aluminum foil.

9. The separating closure liner of claim 1, further comprises a heat resistant polymeric layer positioned between the light tack shearable adhesive and the polyolefin layer.

10. The separating closure liner of claim 9, wherein the heat resistant polymeric layer is of uniform thickness.

11. The separating closure liner of claim 10, wherein the heat resistant polymeric layer is a PET.

12. The separating closure liner of claim 10, wherein the heat resistant polymeric layer is secured to the polyolefin layer using an adhesive.

13. The separating closure liner of claim 1, wherein said inner seal portion is a laminate including a separating layer to facilitate bonding of the reusable liner portion and inner seal portion during separating closure liner manufacture.

14. A separating closure liner comprising:
   a) a reusable liner portion which fits within a closure for a container comprising:
      i) a polyolefin layer; and
      ii) a film layer adjacent the polyolefin layer;
   b) an inner seal portion for attachment to a neck of said container; and
   c) a pressure sensitive light tack shearable adhesive layer disposed between said inner seal portion and said reusable liner portion, wherein said adhesive layer more readily fails in shear than said reusable liner portion so as to enable separation of the reusable liner portion from the inner seal portion.

15. The separating closure liner of claim 14 wherein said reusable liner portion further comprises a polyolefin foamed layer sandwiched between a pair of non-foamed polyolefin layers.

16. The separating closure liner of claim 14 wherein the light tack shearable adhesive layer has a pattern for torque adjustability for opening a closure containing the separating closure liner.

17. A separating liner for use with a closure for a container, said separating liner comprising: a reusable portion having a size and shape which enables said reusable portion to fit within said closure, said reusable portion containing polyolefin, an inner seal portion constructed to provide a removable seal for an opening of said container, and a pressure sensitive adhesive between said reusable portion and said inner seal portion, said pressure sensitive adhesive more readily failing in shear than said reusable portion so as to enable separation of said reusable portion from said inner seal portion.

18. A separating liner as defined in claim 17, wherein said reusable portion includes a layer of polyolefin foam.

19. A separating liner as defined in claim 17, wherein said pressure sensitive adhesive has a pattern selected to provide a desired shearability for said pressure sensitive adhesive.

* * * * *